United States Patent
Kim et al.

(10) Patent No.: US 8,451,406 B2
(45) Date of Patent: May 28, 2013

(54) COLOR FILTER ARRAY PANEL, MANUFACTURING METHOD THEREOF, AND LIQUID CRYSTAL DISPLAY INCLUDING THE SAME

(75) Inventors: Dong-Gyu Kim, Yongin (KR); Do-Hoon Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 146 days.

(21) Appl. No.: 13/051,777

(22) Filed: Mar. 18, 2011

(65) Prior Publication Data
US 2011/0267555 A1 Nov. 3, 2011

(30) Foreign Application Priority Data

Apr. 30, 2010 (KR) .................. 10-2010-0041007

(51) Int. Cl.
*G02F 1/1333* (2006.01)
(52) U.S. Cl.
USPC ............ 349/106; 349/110; 349/139; 349/156
(58) Field of Classification Search
USPC .................. 349/42, 106, 110, 122, 138, 139, 349/153, 156, 187; 359/891, 892; 430/7, 430/321; 345/88
See application file for complete search history.

(56) References Cited

U.S. PATENT DOCUMENTS

| 7,667,798 B2 * | 2/2010 | Nakagawa ................... 349/106 |
| 2004/0046907 A1 * | 3/2004 | Ham et al. ....................... 349/96 |
| 2005/0122446 A1 * | 6/2005 | Jeon .............................. 349/110 |
| 2008/0158487 A1 * | 7/2008 | Kim et al. ..................... 349/106 |
| 2008/0170188 A1 | 7/2008 | Fan Jiang et al. |

FOREIGN PATENT DOCUMENTS

| KR | 10-2004-0019530 A | 3/2004 |
| KR | 10-2005-0031156 A | 4/2005 |
| KR | 10-2008-0064484 A | 7/2008 |

* cited by examiner

Primary Examiner — Dung Nguyen
Assistant Examiner — Tai Duong
(74) Attorney, Agent, or Firm — Christie, Parker & Hale, LLP

(57) ABSTRACT

A color filter array panel includes: a substrate; a light blocking member on the substrate; a color filter on the substrate and partially overlapping the light blocking member, and having an opening exposing the substrate; a protective member in the opening; and a common electrode on the light blocking member and the color filter, and having a cut portion at a position corresponding to the opening.

22 Claims, 8 Drawing Sheets

COLOR FILTER ARRAY PANEL, MANUFACTURING METHOD THEREOF, AND LIQUID CRYSTAL DISPLAY INCLUDING THE SAME

CROSS-REFERENCE TO RELATED APPLICATIONS

This application claims priority to and the benefit of Korean Patent Application No. 10-2010-0041007 filed in the Korean Intellectual Property Office on Apr. 30, 2010, the entire content of which is incorporated herein by reference.

BACKGROUND

1. Field

The described technology relates generally to a color filter array panel, a manufacturing method thereof, and a liquid crystal display including the same.

2. Description of Related Art

Liquid crystal displays are one of the most widely used flat panel displays. A liquid crystal display includes two substrates on which electrodes are formed, and a liquid crystal layer that is interposed therebetween, where a voltage is applied to the electrodes to re-arrange liquid crystal molecules of the liquid crystal layer and thereby control the amount of transmitted light.

Small and medium-sized liquid crystal displays of a vertical alignment mode achieve a wide viewing angle by forming a fringe field and uniformly distributing a tilting direction of the liquid crystal molecules. However, a process of patterning a common electrode of a color filter array panel is added in order to form a fringe field, and a process of forming a cover film under the common electrode is also added in order to prevent a color filter from being damaged by an etching solution during the patterning of the common electrode. Accordingly, manufacturing costs and time increase. Moreover, the cover film on the periphery of the display panel covers a light blocking member, so that the cover film is brought into direct contact with a sealing material, thereby lowering a release force between a thin film transistor array panel and the color filter array panel.

The above information disclosed in the Background section is only for enhancement of understanding of the background of the described technology, and therefore may contain information that does not form the prior art that is already known in this country to a person of ordinary skill in the art.

SUMMARY

The described technology provides a color filter array panel with a simple manufacturing process, a manufacturing method thereof, and a liquid crystal display including the same.

An exemplary embodiment provides a color filter array panel including: a substrate; a light blocking member on the substrate; a color filter on the substrate and partially overlapping the light blocking member, and having an opening exposing the substrate; a protective member in the opening; and a common electrode on the light blocking member and the color filter, and having a cut portion at a position corresponding to the opening.

A diameter of the cut portion may be equal to or less than a diameter of the opening.

The color filter may include more than one opening.

The color filter array panel may further include a spacer on the light blocking member, and the spacer may include a same material as the protective member.

The common electrode may have a peripheral cut portion corresponding to the spacer.

Another exemplary embodiment provides a manufacturing method of a color filter array panel, the method including: forming a light blocking member on a substrate; forming a color filter on the substrate partially overlapping the light blocking member and having an opening; forming a protective member in the opening; forming a spacer on the light blocking member; and forming a common electrode having a cut portion at a position corresponding to the opening.

The method may further include forming a peripheral cut portion at a position corresponding to the spacer substantially simultaneously with the forming of the cut portion of the common electrode.

The protective member and the spacer may be formed substantially simultaneously by using a first slit mask.

The protective member may be formed at a position corresponding to a slit region of the first slit mask, and the spacer may be formed at a position corresponding to an opening region of the first slit mask.

The protective member and the spacer may include a negative photosensitive film.

The common electrode having the cut portion and the peripheral cut portion may be formed by using a second slit mask.

The first slit mask and the second slit mask may be the same slit mask.

A size of the slit region of the first slit mask may be greater than or equal to a size of a slit region of the second slit mask.

Another exemplary embodiment provides a liquid crystal display including: a thin film transistor array panel including a first substrate, a gate line on the first substrate, a data line insulated from and crossing the gate line, a thin film transistor connected to the gate line and the data line, and a pixel electrode connected to the thin film transistor; a color filter array panel including a second substrate facing the first substrate, a light blocking member on the second substrate, a color filter on the second substrate and partially overlapping the light blocking member, and having an opening exposing the second substrate, a protective member in the opening, and a common electrode on the light blocking member and the color filter, and having a cut portion at a position corresponding to the opening; and a liquid crystal layer between the thin film transistor array panel and the color filter array panel.

The liquid crystal display may further include a sealing material between the thin film transistor array panel and the color filter array panel on a periphery of the thin film transistor array panel and the color filter array panel, for sealing the liquid crystal display.

The light blocking member may include a display light blocking member in a display region of the liquid crystal display including a plurality of pixels, and a periphery light blocking member located on a periphery of the display region and in contact with the sealing material.

A diameter of the cut portion may be equal to or less than a diameter of the opening.

The color filter may include more than one opening.

The liquid crystal display may further include a spacer on the light blocking member, and the spacer may include a same material as the protective member.

The common electrode may have a peripheral cut portion corresponding to the spacer.

According to embodiments of the present invention, the color filter array panel prevents or reduces occurrence of the color filter from being damaged by an etching solution when forming the common cut portion of the common electrode, by filling the protective member in the opening of the color filter.

Moreover, no separate cover film for protecting the color filter from the etching solution of the common electrode is formed on the color filter, thereby shortening the manufacturing process and reducing manufacturing costs.

Further, the opening of the color filter and the common cut portion of the common electrode may be formed using the same slit mask, thereby also simplifying the manufacturing process and reducing manufacturing costs.

In addition, because no separate cover film is formed on the light blocking member, the light blocking member on the periphery of the display panel is brought into direct contact with the sealing material. Accordingly, a release force or bonding force between the thin film transistor array panel and the color filter array panel is improved.

Additionally, the peripheral cut portion of the common electrode is formed at a position corresponding to the spacer, to bring the spacer into direct contact with the light blocking member, whereby there occurs less or no blurring defect due to applied pressure.

Figure 1:
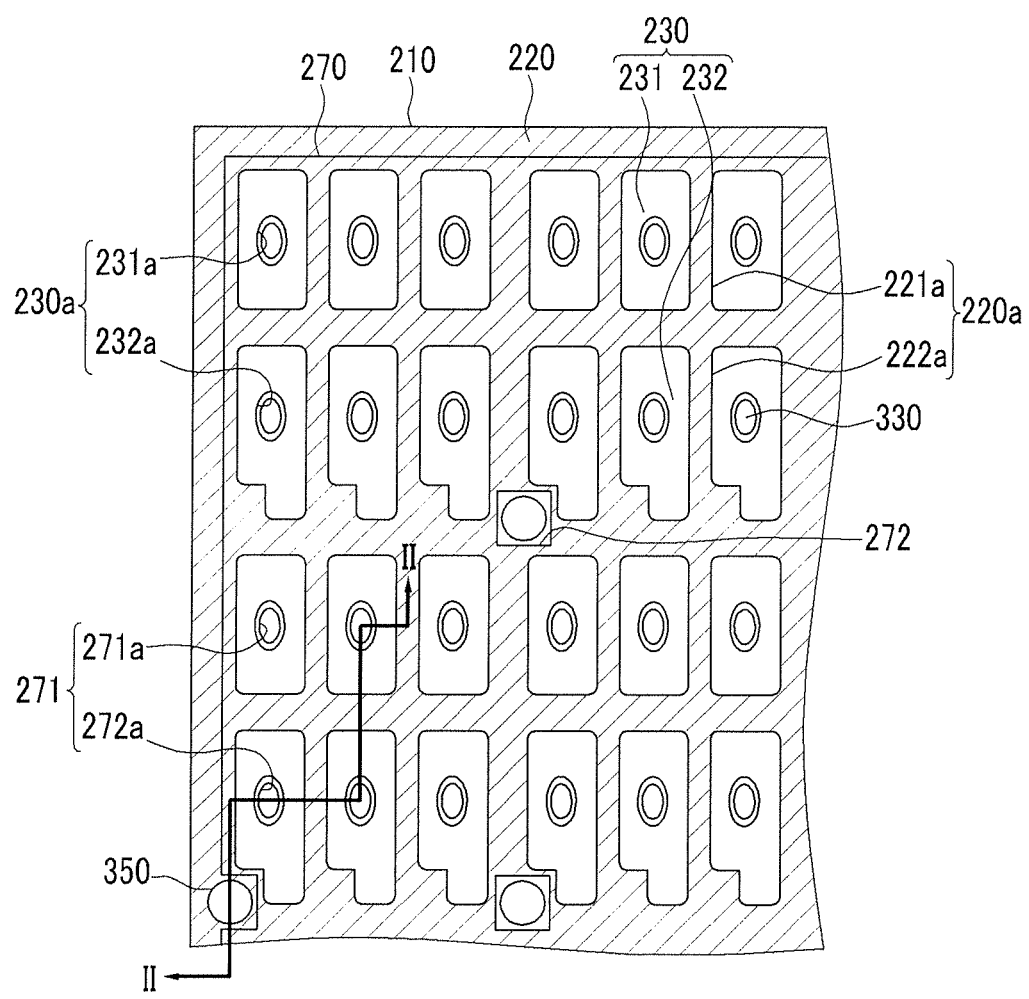
FIG. 1 is a layout view of a color filter array panel according to one exemplary embodiment.

| Description of symbols | |
|---|---|
| 121: gate line | 140: gate insulating layer |
| 171: data line | 190: pixel electrode |
| 220: light blocking member | 230: color filter |
| 270: common electrode | 271: common cut portion |
| 272: peripheral cut portion | 330: protective member |
| 350: spacer | 370: sealing material |

DETAILED DESCRIPTION

The present invention will be described more fully hereinafter with reference to the accompanying drawings, in which exemplary embodiments of the invention are shown. As those skilled in the art will recognize, the described embodiments may be modified in various different ways without departing from the spirit or scope of the present invention.

For various exemplary embodiments, elements having the same or similar constitution are designated with the same reference numerals and explained representatively in the first exemplary embodiment. In other exemplary embodiments, only elements that are different from those in the first exemplary embodiment are described.

In addition, the size and thickness of each component shown in the drawings are arbitrarily shown for better understanding and ease of description, and thus the present invention is not limited to those properties or characteristics shown in the drawings.

In the drawings, the thickness of layers, films, panels, regions, etc., are exaggerated for clarity. Furthermore, it will be understood that when an element, such as a layer, film, region, or substrate, is referred to as being "on" another element, it can be directly on the other element, or one or more intervening elements may also be present.

Figure 2:
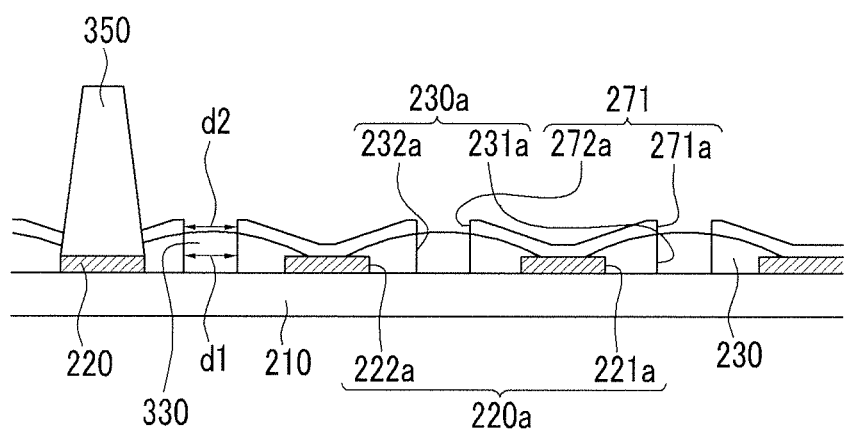
FIG. 2 is a cross-sectional view taken along line II-II of the color filter array panel of FIG. 1.

Referring to FIGS. 1 and 2, a color filter array panel according to one exemplary embodiment will be described in detail.

FIG. 1 is a layout view of a color filter array panel according to one exemplary embodiment, and FIG. 2 is a cross-sectional view taken along line II-II of the color filter array panel of FIG. 1.

As shown in FIGS. 1 and 2, a light blocking member 220 called a black matrix is formed on a substrate 210 made of transparent glass, etc. The light blocking member 220 is made of a metal such as chrome, or an organic material. The light blocking member 220 has a plurality of opening regions 220a exposing the substrate 210. The plurality of opening regions 220a of the light blocking member 220 are arranged in row and column directions, and each of the opening regions 220a of the light blocking member 220 includes a first sub-opening region 221a and a second sub-opening region 222a that are separated in a longitudinal direction. The first sub-opening region 221a has a rectangular shape, and the second sub-opening region 222a has a rectangular shape with an additional rectangular shaped projection at, for example, a right bottom. One of the opening regions 220a of the light blocking member 220 corresponds to one pixel, and the first sub-opening region 221a and second sub-opening region 222a of the light blocking member 220 correspond to a first subpixel and a second subpixel, respectively.

A plurality of color filters 230 are formed on the substrate 210 to partially overlap the light blocking member 220, and the color filters 230 are arranged so as to be embedded in the opening regions 220a defined by the light blocking member 220. The color filters 230 include first sub-color filters 231 embedded in the first opening regions 221a and second sub-color filters 232 embedded in the second opening regions 222a. The first color filters 231 and the second color filters 232 are separated by the light blocking member 220. Each color filter 230 may represent one of three primary colors, for example, red, blue, or green. The color filters arranged in a column direction may represent the same color.

The color filters 230 have openings 230a exposing the substrate 210, where the openings 230a include first openings 231a exposing the substrate 210 at or near the centers of the first sub-color filters 231 and second opening 232a exposing the substrate 210 at or near the centers of the second sub-color filters 232. The openings 230a may have various shapes, such as a circle, a rectangle, etc.

A protective member 330 made of an organic material is filled in the openings 230a of the color filters 230. The protective member 330 prevents or reduces occurrences of the color filters 230 from being exposed through the openings 230a, and protects the color filters 230 from an etching solution of a common electrode 270.

A spacer 350, which may be made of the same material as the protective member 330, is formed on the light blocking member 220. The spacer 350 is formed to maintain a distance between a color filter array panel 200 and a thin film transistor array panel 100.

The common electrode 270 may be made of a transparent conductive material such as ITO or IZO, and is formed on a portion of the light blocking member 220 with no spacer 350 formed thereon and on the color filters 230. The common electrode 270 receives a common voltage, and has common cut portions 271 at positions corresponding to the openings 230a of the color filters 230, and peripheral cut portions 272 at positions corresponding to the spacers 350. The common cut portions 271 of the common electrode 270 include first cut portions 271a formed at positions corresponding to the first openings 231a, and second cut portions 272a formed at positions corresponding to the second openings 232a. The peripheral cut portions 272 of the common electrode 270 expose the spacer 350.

The common cut portions 271 may have various shapes, such as a circle, a rectangle, etc. A diameter d2 of the common cut portions 271 may be substantially equal to a diameter d1 of the openings 230a of the color filters 230, or may be less than the diameter d1 of the openings 230a. In the case where the diameter d2 of the common cut portions 271 is greater than the diameter d1 of the openings 230a of the color filters 230, the color filters 230 are exposed through the common cut portions 271, and may be damaged by the etching solution for forming the common cut portions 271 of the common electrode 270. Accordingly, the diameter d2 of the common cut portions 271 is generally substantially equal to or less than the diameter d1 of the openings 230a of the color filters 230.

In this manner, the color filters 230 can avoid being damaged by the etching solution when forming the common cut portions 271 of the common electrode 270 by filling the protective member 330 in the openings 230a of the color filters 230.

Moreover, no separate cover film for protecting the color filters 230 from the etching solution of the common electrode 270 is formed on the color filters 230, thereby shortening the manufacturing process and reducing manufacturing costs.

Next, a manufacturing method of the color filter array panel shown in FIGS. 1 and 2 according to one exemplary embodiment will be described in detail, with reference to FIGS. 3 to 7.

FIGS. 3 to 7 are cross-sectional views sequentially showing a manufacturing method of the color filter array panel of FIG. 2.

Figure 3:
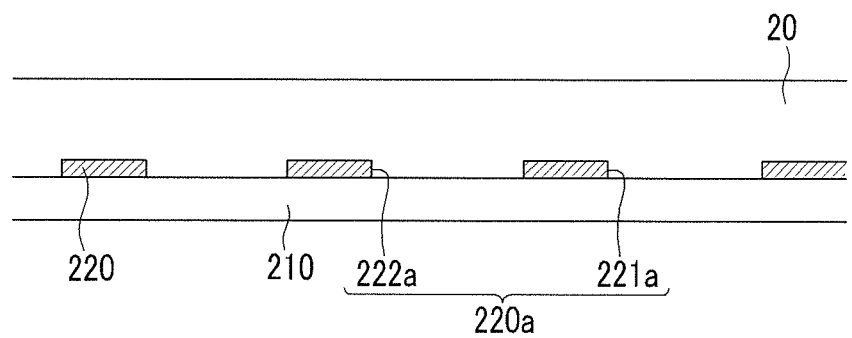
FIGS. 3 to 7 are cross-sectional views sequentially showing a manufacturing method of the color filter array panel of FIG. 2.

First, as shown in FIG. 3, the light blocking member 220 having the plurality of opening regions 220a is formed on the substrate 210. Then, a color filter film 20 is formed on the substrate 210 and the light blocking member 220.

Figure 4:
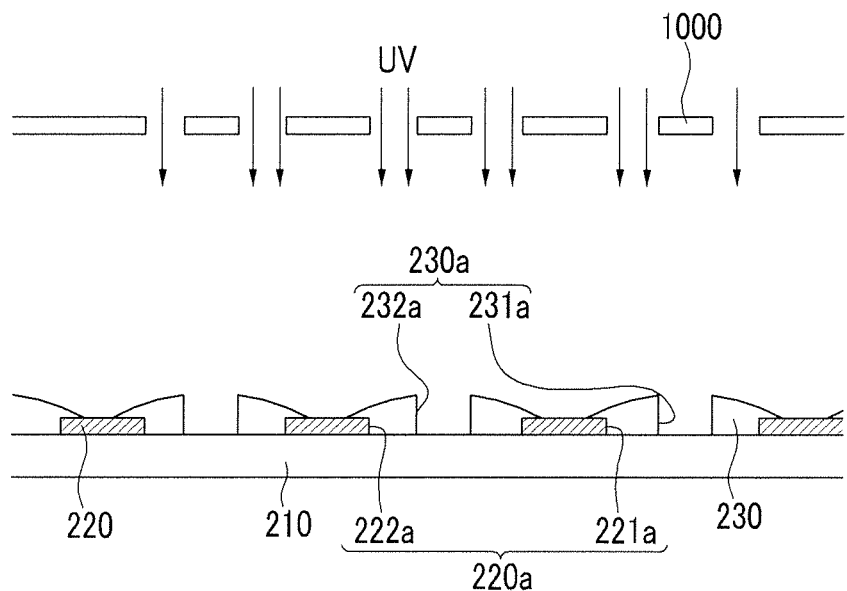

Next, as shown in FIG. 4, the color filter 230 partially overlapping the light blocking member 220 is formed on the substrate 210 by exposing the color filter film 20 to ultraviolet (UV) light and developing the color filter 230 by using an opening mask 1000. At this time, the openings 230a exposing the substrate 210 is formed in the color filter 230.

Figure 5:
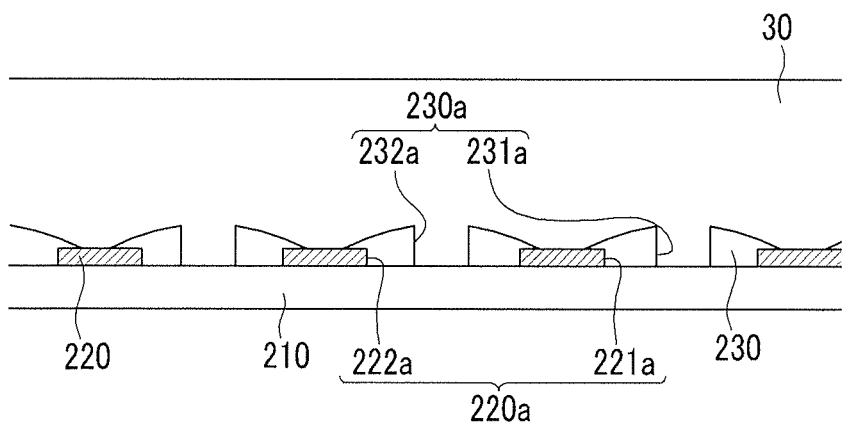

Next, as shown in FIG. 5, a spacer film 30 is formed on the light blocking member 220 and the color filter 230.

Figure 6:
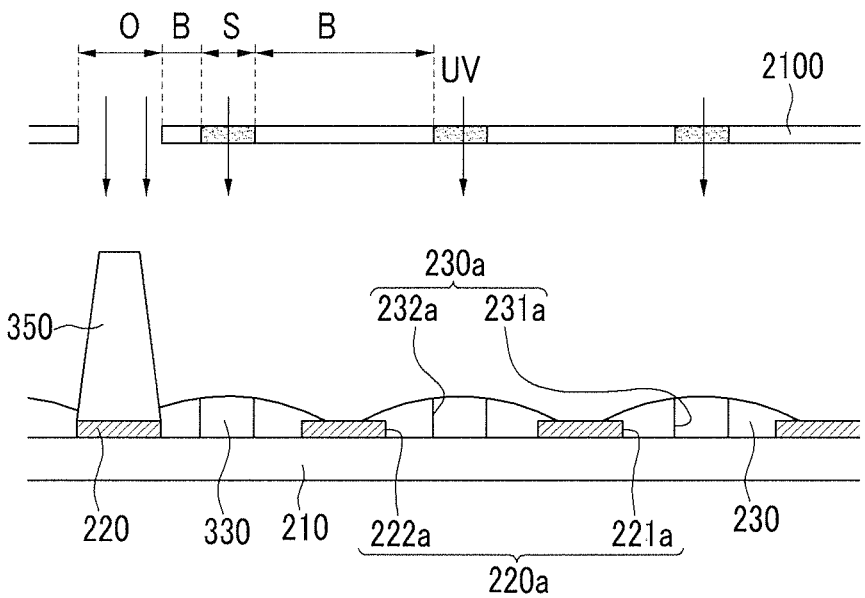

Next, as shown in FIG. 6, the protective member 330 and the spacer 350 are simultaneously formed by exposing the spacer film 30 to UV light and developing the protective member 330 and the spacer 350 by using a first slit mask 2100.

In more detail, the first slit mask 2100 includes a slit region S for partially passing light therethrough, an opening region O for fully passing light therethrough, and a blocking region B for blocking light.

Since the spacer film 30 is a negative photosensitive film, portions exposed to UV light remain in the development process. Accordingly, the spacer 350 is formed by performing exposure and development processes on (e.g., entirely on) the position corresponding to the opening region O of the first slit mask 2100 to leave or retain substantially all of the exposed portion of the spacer film 30. The protective members 330 are formed by performing slit exposure and development processes on the positions corresponding to the slit regions S of the first slit mask 2100, to leave some of the exposed portion of the spacer film 30. Portions of the spacer film 30 not exposed to UV light are removed, because UV light is blocked at positions corresponding to the blocking region B of the first slit mask 2100. The protective member 330 of this type fills the openings 230a, and the spacer 350 is located on the light blocking member 220.

Figure 7:
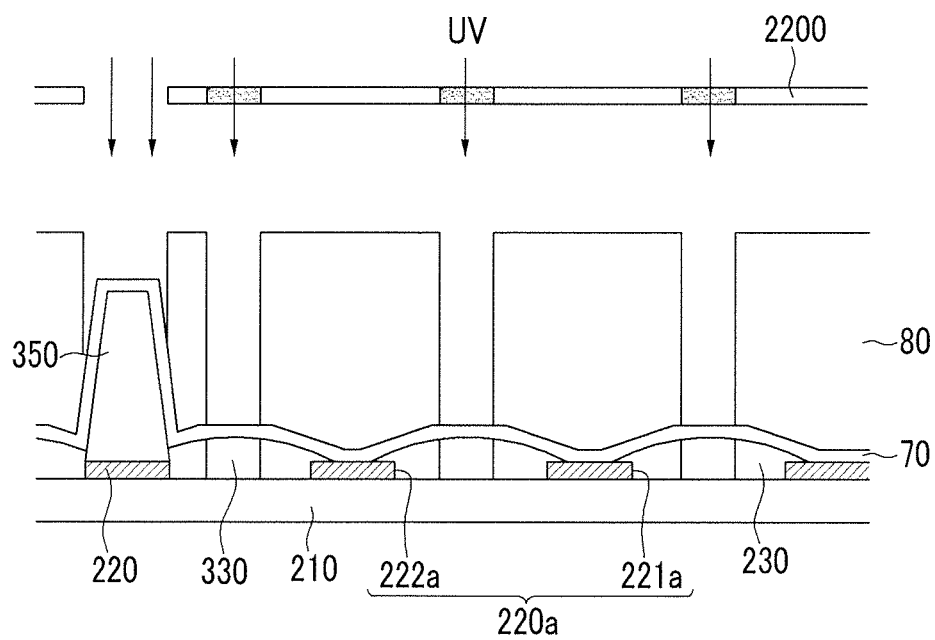

Next, as shown in FIG. 7, a common electrode film 70 is formed on the light blocking member 220, the color filter 230, and the protective member 330. Then, a positive photosensitive film is formed on the common electrode film 70, and a photosensitive film pattern 80 is formed by exposing the positive photosensitive film to the UV light and developing the photosensitive film pattern 80 by using a second slit mask 2200. The size of a slit region S of the second slit mask 2200 may be equal to or less than the size of the slit region S of the first slit mask 2100.

Next, as shown in FIGS. 1 and 2, the common electrode film 70 is etched by using the photosensitive film pattern 80 as an etching mask, thus forming the common electrode 270 having common cut portions 271 at positions corresponding to the openings 230a of the color filters 230. At this time, peripheral cut portions 272 are also formed at positions corresponding to spacers 350, thus exposing the spacers 350.

Since the photosensitive film pattern 80 is made of a positive photosensitive film, portions thereof exposed to UV light are removed in the development process. Therefore, where the common cut portions 271 of the common electrode 270 are formed at positions corresponding to the openings 230a of the color filters 230, the second slit mask 2200 having the same pattern as the first slit mask 2100 can be used. Specifically, if the diameter d1 of the openings 230a of the color filters 230 and the diameter d2 of the common cut portions 271 of the common electrode 270 are substantially equal to each other, a same slit mask can be utilized as both the first slit mask 2100 and the second slit mask 2200, thereby simplifying the manufacturing process and reducing manufacturing costs.

Next, a thin film transistor array panel corresponding to the color filter array panel, and a liquid crystal display including the same, according to one exemplary embodiment will be described below in detail with reference to FIGS. 8 and 9.

Figure 8:
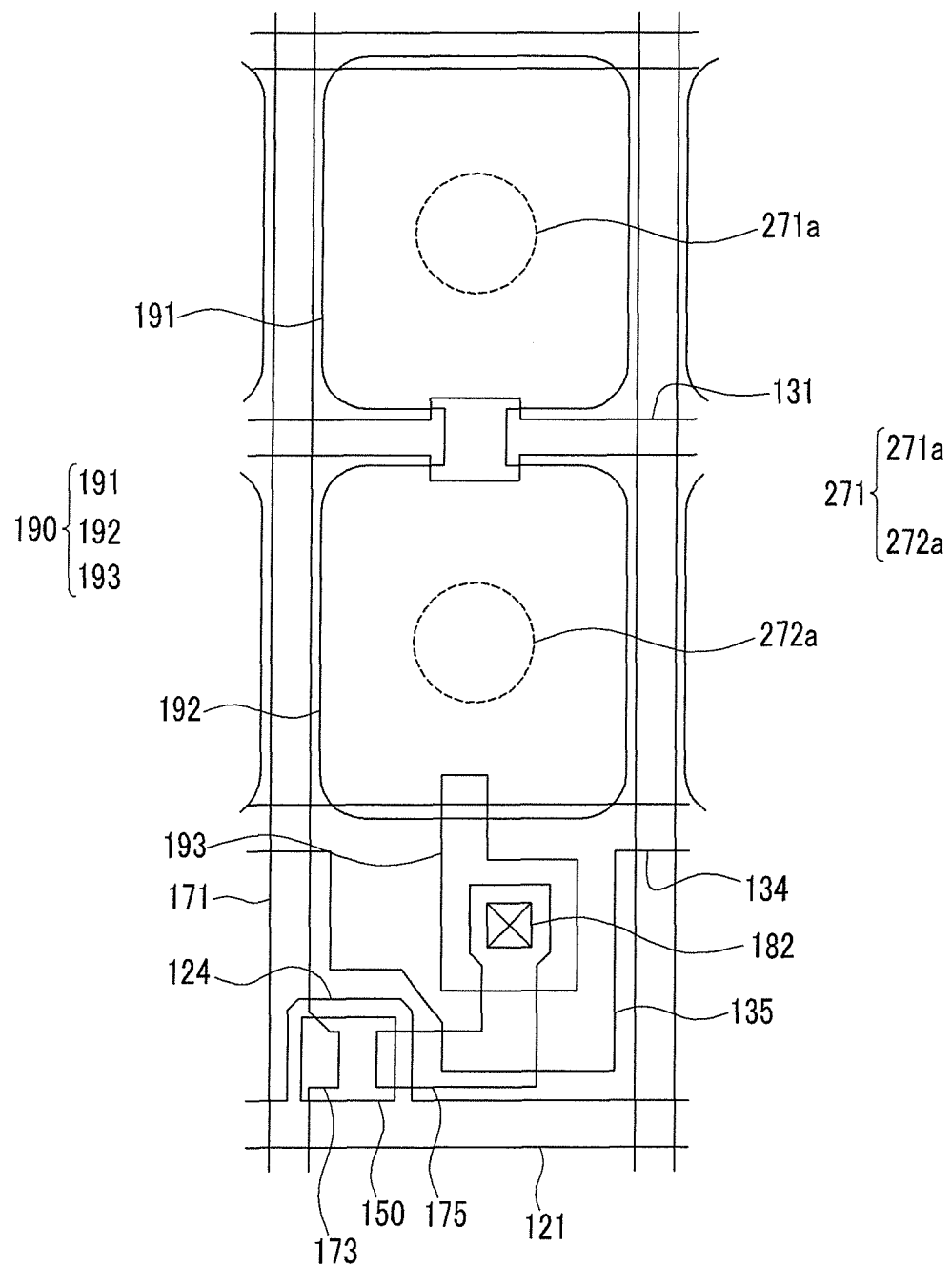
FIG. 8 is a layout view of a thin film transistor array panel corresponding to the color filter array panel according to one exemplary embodiment.
Figure 9:
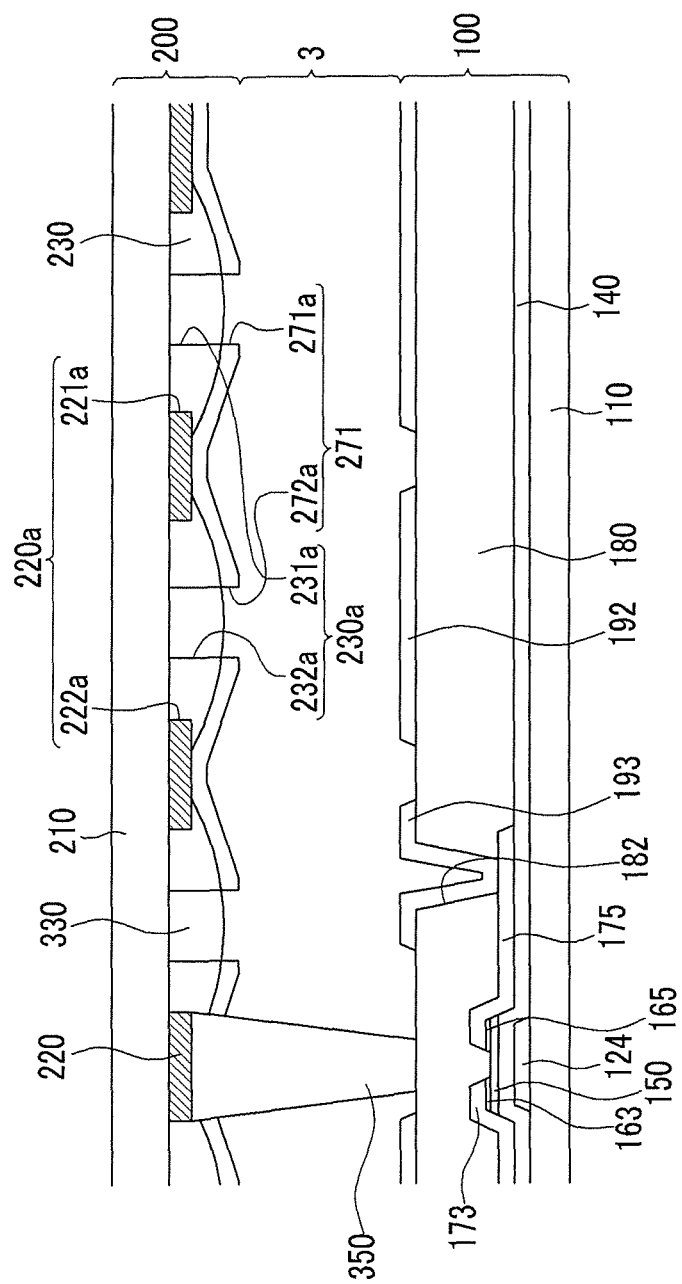
FIG. 9 is a cross-sectional view of a liquid crystal display including the color filter array panel and the thin film transistor array panel according to one exemplary embodiment.

FIG. 8 is a layout view of a thin film transistor array panel corresponding to the color filter array panel according to one exemplary embodiment, and FIG. 9 is a cross-sectional view of a liquid crystal display including the color filter array panel and the thin film transistor array panel according to one exemplary embodiment.

As shown in FIGS. 8 and 9, the thin film transistor array panel 100 according to one exemplary embodiment has gate lines 121 and storage electrode lines 131 and 134 formed on a substrate 110 made of transparent glass or plastic.

The gate lines 121 transmit gate signals and extend substantially in a horizontal or row direction. Each gate line 121 includes a gate electrode 124 projecting from it (e.g., projecting downward). The storage electrode lines 131 and 134 are supplied with a predetermined voltage, and include a first storage electrode line 131 extending substantially parallel to the gate lines 121, a second storage electrode line 134 spaced a distance (e.g., a predetermined distance) from the first storage electrode line 131 and extending substantially parallel to the gate lines 121, and a storage electrode 135 extending (e.g., extending downward) from the second storage electrode line 134.

A gate insulating layer 140 made of, for example, silicon nitride (SiNx) or silicon oxide (SiOx) is formed on the gate lines 121 and the storage electrode lines 131 and 134.

A semiconductor layer 150 including, for example, amorphous silicon (a-Si) is formed on the gate insulating layer 140. The semiconductor layer 150 overlaps the gate electrode 124. Ohmic contacts 163 and 165 are formed on the semiconductor layer 150. The ohmic contacts 163 and 165 may be made of n+ hydrogenated amorphous silicon heavily doped with an n-type impurity such as phosphorus, or they may be made of silicide. The ohmic contacts 163 and 165 are located in pairs on the semiconductor layer 150.

Data lines 171 and drain electrodes 175 are formed on the ohmic contacts 163 and 165 and the gate insulating layer 140.

The data lines 171 transmit data signals and extend substantially in a longitudinal direction (e.g., a vertical or column direction) to intersect or cross the gate lines 121. The data lines 171 also intersect or cross the storage electrode lines 131 and 134, and include a plurality of source electrodes 173 extending toward the gate electrodes 124. The drain electrodes 175 are separated from the data lines 171, and face or oppose the source electrodes 173 with respect to the gate electrode 124. Each of the drain electrodes 175 may include one end portion having a large area and another end portion having a bar shape. The large-area end portion of the drain electrodes 175 may overlap the storage electrodes 135.

One gate electrode 124, one source electrode 173, and one drain electrode 175 form a thin film transistor (TFT) along with the semiconductor layer 150, and a channel of the thin film transistor is formed in the semiconductor layer 150 between the source electrode 173 and the drain electrode 175.

The ohmic contacts 163 and 165 are interposed between the underlying semiconductor layer 150 and the overlying source electrodes 173 and drain electrodes 175.

A passivation layer 180 is formed on the data lines 171, the drain electrodes 175, and the exposed portions of the semiconductor layer 150. The passivation layer 180 is made of an inorganic insulating material, such as silicon nitride or silicon oxide, an organic insulating material, or a low dielectric constant insulating material. The passivation layer 180 may be made of an organic insulating material having photosensitivity, and the surface of the passivation layer 180 may be even. Alternatively, the passivation layer 180 may have a double-layered structure having a lower inorganic layer and an upper organic layer, in order to maintain the excellent insulating characteristics or properties of organic layer, while preventing or reducing the exposed portions of the semiconductor layer 150 from being damaged.

Contact holes 182 for exposing the drain electrodes 175 are formed in the passivation layer 180, and pixel electrodes 190 are formed on the passivation layer 180. The pixel electrodes 190 include first subpixel electrodes 191 corresponding to the first sub-opening regions 221a of the light blocking member 220, second subpixel electrodes 192 corresponding to the second sub-opening regions 222a of the light blocking member 220, and extension electrodes 193 extending from the second subpixel electrodes 192 and overlapping the drain electrodes 175.

A central portion of the first subpixel electrode 191 corresponds to a first cut portion 271a of the common electrode 270, and a central portion of the second subpixel electrode 192 corresponds to a second cut portion 272a of the common electrode 270.

Accordingly, the periphery of the first subpixel electrode 191 forms a fringe field with the first cut portion 271a of the common electrode 270, and the periphery of the second subpixel electrode 192 forms a fringe field with the second cut portion 272a of the common electrode 270, thereby obtaining a wide viewing angle.

The pixel electrodes 190 may be made of a transparent conductive material such as ITO or IZO, or a reflective metal such as aluminum, silver, or an alloy thereof.

The pixel electrodes 190 are physically and electrically connected to the drain electrodes 175 through the contact holes 182, and are supplied with data voltages from the drain electrodes 175. The pixel electrodes 190 supplied with the data voltages generate an electric field together with the common electrode 270 of the color filter array panel, which is supplied with a common voltage, thereby determining an alignment of liquid crystal molecules of a liquid crystal layer 3 between the two electrodes. The pixel electrodes 190 and the common electrode 270 constitute capacitors (hereinafter referred to as "liquid crystal capacitors"), and maintain an applied voltage after the thin film transistors are turned off.

The pixel electrodes 190 overlap the storage electrode lines 131 and 134 including the storage electrodes 135. The capacitors referred to as "storage capacitors" are formed by overlapping the pixel electrodes 190 and the drain electrodes 175 connected thereto with the storage electrode lines 131 and 134, and enhance the voltage storing capacity of the liquid crystal capacitors.

The color filter array panel 200 facing the thin film transistor array panel 100 is spaced apart from the thin film transistor array panel 100 by the spacers 350.

As described above, the spacers 350 of the color filter array panel 200 are in direct contact with the light blocking member 220. Therefore, the spacer 350 is not located on the common electrode 270, thereby preventing or reducing a phenomenon where, upon application of a pressure (e.g., a predetermined pressure) to the liquid crystal display, the common electrode 270 is crushed and a cell gap is reduced. As a consequence, a blurring defect caused by a reduced cell gap can be avoided or reduced.

Meanwhile, the liquid crystal display according to one exemplary embodiment has no separate cover film formed on the light blocking member 220, so that the light blocking member 220 on a periphery of the display panel is in direct contact with a sealing material 370. Accordingly, the release force or bonding force between the thin film transistor array panel 100 and the color filter array panel 200 is improved.

This will be described in detail with reference to FIGS. 10 and 11.

Figure 10:
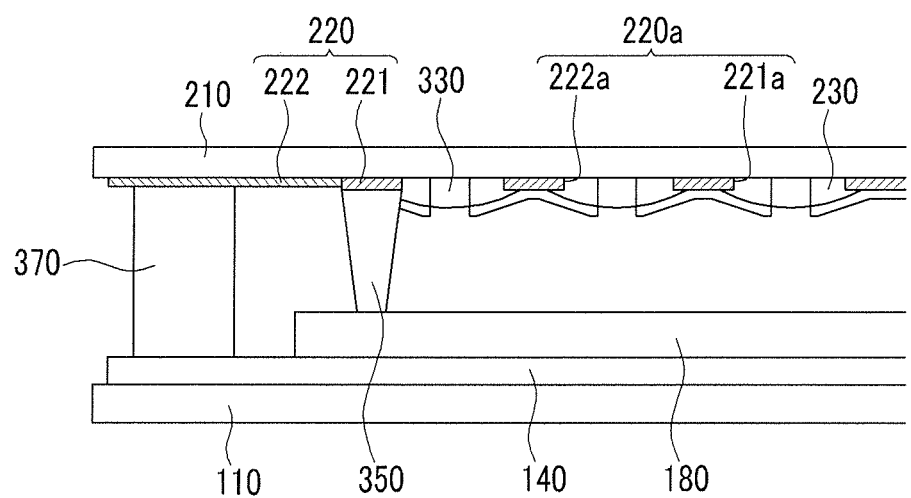
FIG. 10 is a cross-sectional view showing the periphery of the liquid crystal display according to one exemplary embodiment.
Figure 11:
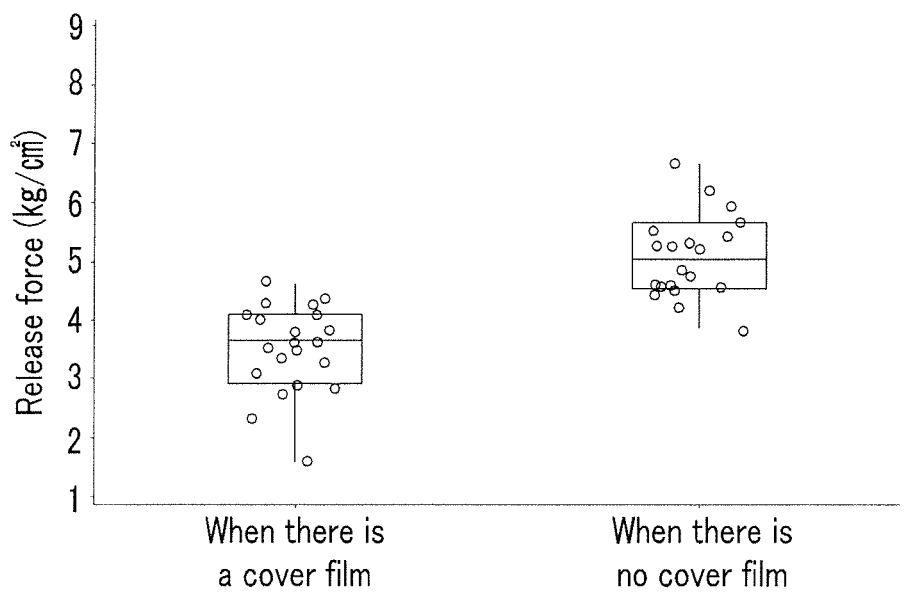
FIG. 11 is a graph showing a release force between the thin film transistor array panel and the color filter array panel depending on the presence or absence of a cover film.

FIG. 10 is a cross-sectional view showing a periphery of a liquid crystal display according to one exemplary embodiment, and FIG. 11 is a graph showing the release force between the thin film transistor array panel and the color filter array panel depending on the presence or absence of a cover film.

As shown in FIG. 10, the sealing material 370 is formed between the thin film transistor array panel 100 and the color filter array panel 200. The sealing material 370 seals the thin film transistor array panel 100 and the color filter array panel 200, and bonds the thin film transistor array panel 100 and the color filter array panel 200 together. A sealing material of this type can be formed on the peripheries of the thin film transistor array panel 100 and the color filter array panel 200.

The light blocking member 220 includes a display light blocking member 221 located in a display region including a plurality of pixels, and a periphery light blocking member 222 located on the periphery or edge regions of the display region.

In one exemplary embodiment, no separate cover film is formed on the periphery light blocking member 222, so that the periphery light blocking member comes in direct contact with the sealing material 370. Accordingly, the sealing material 370 according to one exemplary embodiment is attached to the periphery light blocking member 222 with a greater release force, when compared to contact between a cover film and the sealing material 370.

As shown in FIG. 11, when a cover film made of an organic material is formed on the periphery light blocking member 222, a release force of about 3 kg/cm² exists. Meanwhile, when a cover film is not formed on the periphery light blocking member 222, a release force of about 5 kg/cm² exists. Therefore, it can be seen that, if the sealing material 370 is in direct contact with the periphery light blocking member 222, the release force between the thin film transistor array panel 100 and the color filter array panel 200 is improved.

While this disclosure has been described in connection with what is presently considered to be practical exemplary embodiments, it is to be understood that the invention is not limited to the disclosed embodiments, but is instead intended to cover various modifications and equivalent arrangements included within the spirit and scope of the appended claims.

What is claimed is:

1. A color filter array panel comprising:
a substrate;
a light blocking member on the substrate;
a color filter on the substrate and partially overlapping the light blocking member, and having an opening exposing the substrate;
a protective member in the opening; and
a common electrode different from the protective member on the light blocking member and the color filter, the common electrode having at least a portion in direct contact with the color filter and a cut portion at a position corresponding to the opening.

2. The color filter array panel of claim 1, wherein a diameter of the cut portion is equal to or less than a diameter of the opening.

3. The color filter array panel of claim 2, wherein the color filter includes more than one opening.

4. The color filter array panel of claim 3, further comprising a spacer on the light blocking member.

5. The color filter array panel of claim 4, wherein the spacer comprises a same material as the protective member.

6. The color filter array panel of claim 4, wherein the common electrode has a peripheral cut portion corresponding to the spacer.

7. A manufacturing method of a color filter array panel, the method comprising:
forming a light blocking member on a substrate;
forming a color filter on the substrate partially overlapping the light blocking member and having an opening;
forming a protective member in the opening;
forming a spacer on the light blocking member; and
forming a common electrode different from the protective member on the light blocking member and the color filter, the common electrode having at least a portion formed in direct contact with the color filter and a cut portion at a position corresponding to the opening.

8. The method of claim 7, further comprising forming a peripheral cut portion in the common electrode at a position corresponding to the spacer substantially simultaneously with the forming of the cut portion of the common electrode.

9. The method of claim 8, wherein the protective member and the spacer are formed substantially simultaneously by using a first slit mask.

10. The method of claim 9, wherein the protective member is formed at a position corresponding to a slit region of the first slit mask, and the spacer is formed at a position corresponding to an opening region of the first slit mask.

11. The method of claim 10, wherein the protective member and the spacer comprise a negative photosensitive film.

12. The method of claim 11, wherein the common electrode having the cut portion and the peripheral cut portion is formed by using a second slit mask.

13. The method of claim 12, wherein the first slit mask and the second slit mask are the same slit mask.

14. The method of claim 12, wherein a size of the slit region of the first slit mask is greater than or equal to a size of a slit region of the second slit mask.

15. A liquid crystal display comprising:
a thin film transistor array panel comprising:
a first substrate;
a gate line on the first substrate;
a data line insulated from and crossing the gate line;
a thin film transistor connected to the gate line and the data line; and
a pixel electrode connected to the thin film transistor;
a color filter array panel comprising:
a second substrate facing the first substrate;
a light blocking member on the second substrate;
a color filter on the second substrate and partially overlapping the light blocking member, and having an opening exposing the second substrate;
a protective member in the opening; and
a common electrode different from the protective member on the light blocking member and the color filter, the common electrode having at least a portion in direct contact with the color filter and a cut portion at a position corresponding to the opening; and
a liquid crystal layer between the thin film transistor array panel and the color filter array panel.

16. The liquid crystal display of claim 15, further comprising a sealing material between the thin film transistor array panel and the color filter array panel on a periphery of the thin film transistor array panel and color filter array panel, for sealing the liquid crystal display.

17. The liquid crystal display of claim 16, wherein the light blocking member comprises:
a display light blocking member in a display region of the liquid crystal display comprising a plurality of pixels; and
a periphery light blocking member located on a periphery of the display region and in contact with the sealing material.

18. The liquid crystal display of claim 15, wherein a diameter of the cut portion is equal to or less than a diameter of the opening.

19. The liquid crystal display of claim 18, wherein the color filter includes more than one opening.

20. The liquid crystal display of claim 19, further comprising a spacer on the light blocking member.

21. The liquid crystal display of claim 20, wherein the spacer comprises a same material as the protective member.

22. The liquid crystal display of claim 21, wherein the common electrode has a peripheral cut portion corresponding to the spacer.

* * * * *